United States Patent [19]
Bowman et al.

[11] Patent Number: 5,535,232
[45] Date of Patent: Jul. 9, 1996

[54] OPTICALLY PUMPED, PRASEODYMIUM BASED SOLID STATE LASER

[75] Inventors: Steven R. Bowman, Davidsonville; Joseph Ganem, Reisterstown, both of Md.; Barry J. Feldman, Arlington, Va.

[73] Assignee: The United States of America as represented by the Secretary of the Navy, Washington, D.C.

[21] Appl. No.: 381,243

[22] Filed: Jan. 31, 1995

[51] Int. Cl.$^6$ .............................. H01S 3/091; H01S 3/092
[52] U.S. Cl. .................. 372/70; 372/40; 372/68
[58] Field of Search ................ 372/40, 41, 68, 372/69, 70

[56] References Cited

U.S. PATENT DOCUMENTS

| | | | |
|---|---|---|---|
| 3,851,268 | 11/1974 | Singh et al. | 372/68 |
| 4,477,906 | 10/1984 | Case | 372/41 |
| 5,164,953 | 11/1992 | Case et al. | 372/69 |
| 5,166,948 | 11/1992 | Gavrilovic et al | 372/70 |
| 5,274,658 | 12/1993 | Case et al. | 372/69 |
| 5,379,149 | 1/1995 | Snitzer et al. | 372/40 |

OTHER PUBLICATIONS

W. E. Case et. al, "The Photon Avalanche In Rare–Earth Crystals",*J. Luminescence*45 351–53 (1990).

*Primary Examiner*—Rodney B. Bovernick
*Assistant Examiner*—Robert E. Wise
*Attorney, Agent, or Firm*—Thomas E. McDonnell; John J. Karasek

[57] ABSTRACT

The present invention is a solid state laser, including: (1) a laser cavity defined by a first mirror and an opposing second mirror, where these mirrors are reflective at the output wavelength of the laser; (2) a laser medium disposed in the laser cavity, including a low phonon energy host material, doped with an amount of praseodymium ions sufficient to produce a longitudinal mode laser emission from the transition of the praseodymium ions from the $^3F_3$ excited state to a lower energy state when the laser medium is pumped by an appropriate pump, where the energy gap between the $^3F_3$ excited state and the lower energy state corresponds to the output wavelength of the laser; and (3) a pump for the laser medium.

30 Claims, 5 Drawing Sheets

FIG. 9

OPTICALLY PUMPED, PRASEODYMIUM BASED SOLID STATE LASER

BACKGROUND OF THE INVENTION

1. Field of the Invention

The present invention relates to solid state lasers, and more particularly to praseodymium based solid state lasers operating at wavelengths of 1.6, 2.4, 5, and 7 µm.

2. Description of the Related Art

Efficient solid state lasers are desired for a number of applications, including point-to-point communications, illuminators for IR imaging systems, and remote chemical and biological sensing. Solid state lasers offer advantages over liquid and gas lasers in durability and compactness. In particular, solid state lasers operating at wavelengths of about 1.6 µm, about 2.4 µm, about 5 µm, and about 7 µm are desired.

Efficient mid-IR rare earth lasers have not been developed. The principal difficulty in making such lasers has been multiple phonon quenching. In this process, the electronic energy of a rare earth ion is transferred to the vibration modes of the host material lattice (phonons). This reduces the useful time for which the rare earth can store energy. The maximum phonon energy of a particular host (typically expressed in units of $cm^{-1}$) is a material property, and can be measured by, e.g., Raman spectroscopy.

As the energy of a laser transition decreases (i.e., as the wavelength increases), the multiple phonon quenching rates typically increase rapidly. For a desired laser with a transition energy that is less than five times the maximum phonon energy for a given host, the quenching rates will be unacceptably high for efficient laser operation.

SUMMARY OF THE INVENTION

Accordingly, it is an object of this invention to provide an efficient mid-IR rare earth laser.

It is a further object of this invention to provide such a laser operating at wavelengths of about 7 µm, about 5 µm, about 2.4 µm, and about 1.6 µm.

These and additional objects of the invention are accomplished by the structures and processes hereinafter described.

The present invention is a solid state laser, including: (1) a laser cavity defined by a first mirror and an opposing second mirror, where these mirrors are partially reflective at the output wavelength of the laser; (2) a laser medium disposed in the laser cavity, consisting essentially of a low phonon energy host material, doped with an amount of praseodymium ions sufficient to produce a longitudinal mode laser emission from the transition of the praseodymium ions from the $^3F_3$ excited state to a lower energy state when the laser medium is pumped by pumping means, where the energy gap between the $^3F_3$ excited state and the lower energy state corresponds to the output wavelength of the laser; and (3) means for pumping the laser medium.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1:
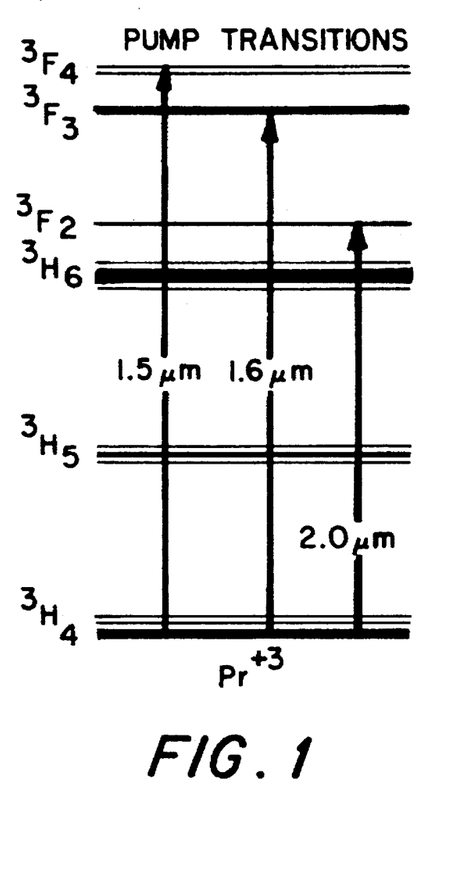
FIG. 1 shows the available pumping transitions of a laser according to the invention.

The upper gain level for the laser of the invention is the $^3F_3$ excited state of $Pr^{3+}$. As shown in FIG. 1, Pr ions in the host of the laser may be pumped up to the $^3F_3$ excited state several different ways. The Pr ions may be pumped from the $^3H_4$ ground state up to the $^3F_4$ excited state, where they will undergo a nonradiative transition to the $^3F_3$ excited state. This absorption is centered at about 1.5 µm for an $LaCl_3$ host, so a pump having a wavelength of about 1.5 µm typically will be used for this pumping scheme. The $^3F_4$ level has a nonzero absorption width, and this width varies with temperature. Accordingly, pumps having wavelengths between about 1.45 µm and about 1.55 µm typically will be suitable for pumping the laser medium from the $^3H_4$ ground state up to the $^3F_4$ excited state.

Alternatively, the laser medium is pumped from the $^3H_4$ ground state up to the $^3F_3$ excited state. This absorption is centered at about 1.6 µm for an $LaCl_3$ host, so a pump having a wavelength of about 1.6 µm typically will be used for this pumping scheme. The $^3F_3$ level has a nonzero absorption width, and this width varies with temperature. For example, at 168K, pumps having wavelengths between about 1.59 µm and about 1.62 µm typically will be suitable for pumping the laser medium from the $^3H_4$ ground state up to the $^3F_3$ excited state.

Since neither of the foregoing pumping schemes entail an upconversion process, these pumping schemes will be referred to herein as direct pumping schemes.

Preferably, the Pr ions in the laser of the invention are pumped using an upconversion process. In this embodiment, Pr ions in the laser medium are pumped from the $^3H_4$ ground state to the $^3F_2$ excited state. From the $^3F_2$ excited state, these ions undergo a nonradiative transition to the $^3H_6$ excited state. Nearby Pr ions in the $^3H_6$ excited state will interact in a cross relaxation step, whereby one Pr ion will absorb energy from a nearby Pr ion, and go to the $^3F_3$ excited state. The nearby Pr ion giving up this energy drops down to the $^3H_5$ excited state. Cross-relaxation is strongly dependent upon concentration, since it requires the interaction of two nearby atoms. Thus, for this cross-relaxation process to occur to a significant degree, it is necessary to have at least a minimum amounts of $Pr^{3+}$ in the host. The absorption band for the $^3H_4 \rightarrow ^3F_2$ transition is centered at about 2.0 µm. At 168 K this absorption has a width ranging from about 2.02

μm to about 2.07 μm. At room temperature, this absorption band ranges from about 2.0 μm to about 2.1 μm.

In an alternative upconversion pumping scheme, Pr ions in the laser medium are pumped from the $^3H_4$ ground state up to the $^3H_6$ excited state. These Pr ions will then undergo the same cross relaxation process described above. The absorption band for the $^3H_4 \rightarrow ^3H_6$ transition is centered at about 2.3 μm. At 168K this absorption has a width ranging from about 2.22 μm to about 2.32 μm. At room temperature, this absorption band ranges from about 2.2 μm to about 2.3 μm.

Suitable amounts of $Pr^{3+}$ range from about $10^{18}$ ions/cm$^3$ to about $10^{21}$ ions/cm$^3$. These amounts of $Pr^{3+}$ are also suitable for use in a direct pumping scheme.

Figure 2:
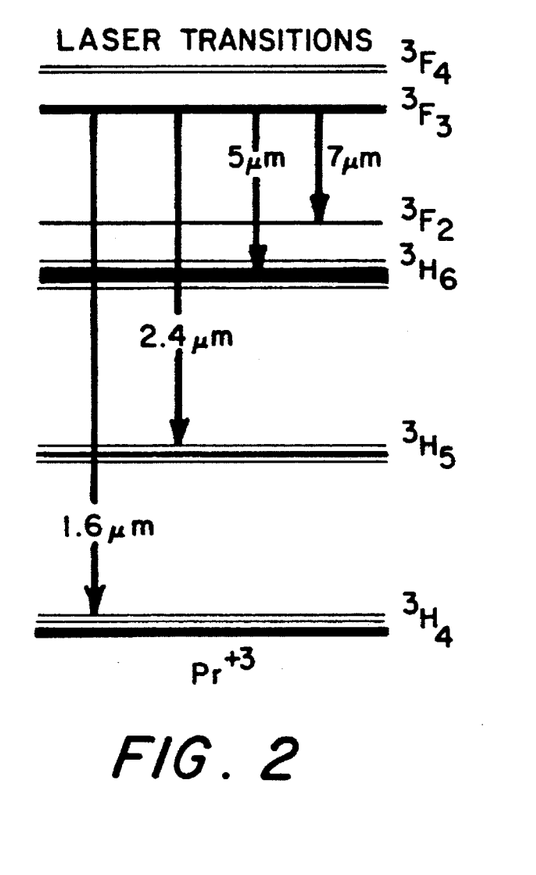
FIG. 2 shows the various lasing transitions of embodiments of a laser according to the invention.

As shown in FIG. 2, the transition of the laser of the invention is between the $^3F_3$ excited state of the Pr ions, and a lower energy state of these ions. Depending on the properties of the mirrors that define the laser cavity, lasing at one or more of the following transitions may be achieved: $^3F_3 \rightarrow ^3F_2$ (at about 7 μm), $^3F_3 \rightarrow ^3H_6$ (at about 5 μm), $^3F_3 \rightarrow ^3H_5$ (at about 2.4 μm), and $^3F_3 \rightarrow ^3H_4$ (at about 1.6 μm).

It is anticipated that tunable operation may be achieved with the laser of this invention, where the tuning range corresponds to the width of the fluorescence spectrum for each of these transitions.

Figure 3:
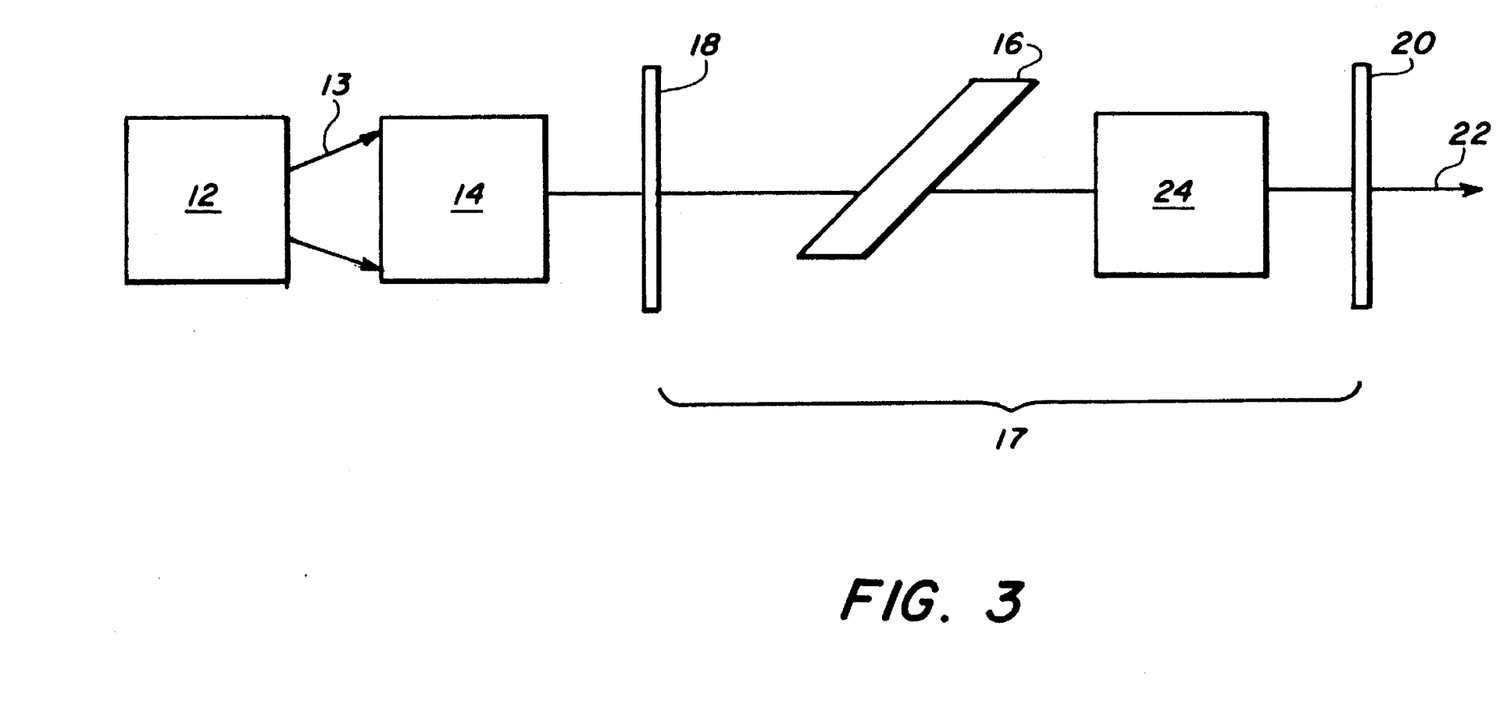
FIG. 3 shows a representation of a laser according to the invention.

As shown in FIG. 3, a typical laser 10 according to the invention will have a pump source 12 for producing pump light 13. Coupling optics 14 direct pump light 13 into the laser medium 16. The laser medium 16 is disposed in a laser cavity 17 defined by opposing mirrors 18,20. When pumped by the pump light 13, the laser medium 16 produces output light 22. Optionally, the laser 10 will include a doubling crystal 24 for frequency doubled operation. Typically, a doubling crystal 24 would be disposed intracavity, although it also could be disposed outside the laser cavity 17.

The particular pump source 12 selected will depend on such factors as the pumping scheme employed, the host material selected, and the operating temperature of the laser. For the preferred upconversion pumping at the $^3H_4 \rightarrow ^3F_2$ transition, suitable pump sources include thulium lasers, such as a 2.02 μm Tm:YAG laser. For upconversion pumping at the $^3H_4 \rightarrow ^3H_6$ transition, suitable pump sources include laser diodes. For direct pumping on the $^3H_4 \rightarrow ^3F_4$ transition, suitable pump sources include laser diodes or erbium lasers. For direct pumping on the $^3H_4 \rightarrow ^3F_3$ transition, suitable pump sources include laser diodes.

Figure 4:
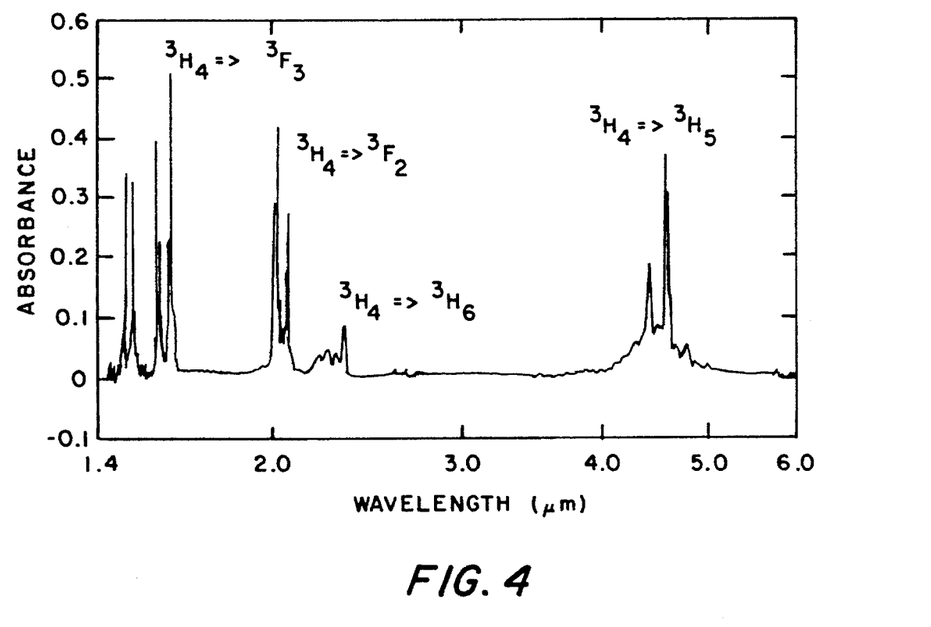
FIG. 4 shows the absorbance spectrum of $Pr^{3+}$:$LaCl_3$ at 168° C.

FIG. 4 shows the absorbance spectrum of a 3 mm thick Pr:LaCl$_3$ laser medium at 168 K, which exemplifies the laser media and operating conditions of the invention. This demonstrates that the pump energies described above will be suitable for use in the invention.

Regarding the laser medium 12 used in the invention, the selection of an appropriate host material is critical to the invention. A host material for a laser according to the invention accepts $Pr^{3+}$ ion dopants, and has low energy ($\geq$ about 350 cm$^{-1}$) phonons. Preferably, the host is highly transparent through pumping and output spectral ranges. Preferably, the maximum allowed phonon energy of the host is $\geq$ about 300 cm$^{-1}$. More preferably, the maximum allowed phonon energy of the host is $\geq$ about 250 cm$^{-1}$. Preferably, the host accepts a wide range of amounts of $Pr^{3+}$ ion dopants. Preferably, the host accepts between about $10^{18}$ and about $10^{21}$ ions/cm$^3$.

Suitable hosts include lanthanum trichloride, lanthanum tribromide, lanthanum triiodide, yttrium trichloride, and lutetium trichloride. Lasers according to the invention have operated successfully with LaCl$_3$ hosts doped with between 0.01% and 100% Pr substituting for La. LaCl$_3$, with a maximum phonon energy of about 210–260 cm$^{-1}$ is a typical host according to the invention. LaCl$_3$ is a soft uniaxial crystal, $n_c$=1.89 and $n_o$=1.83. It is a hygroscopic material and must be stored in a dry environment. Optical quality crystals typically are grown using a modified Bridgman-Stockbarger technique.

Figure 5:
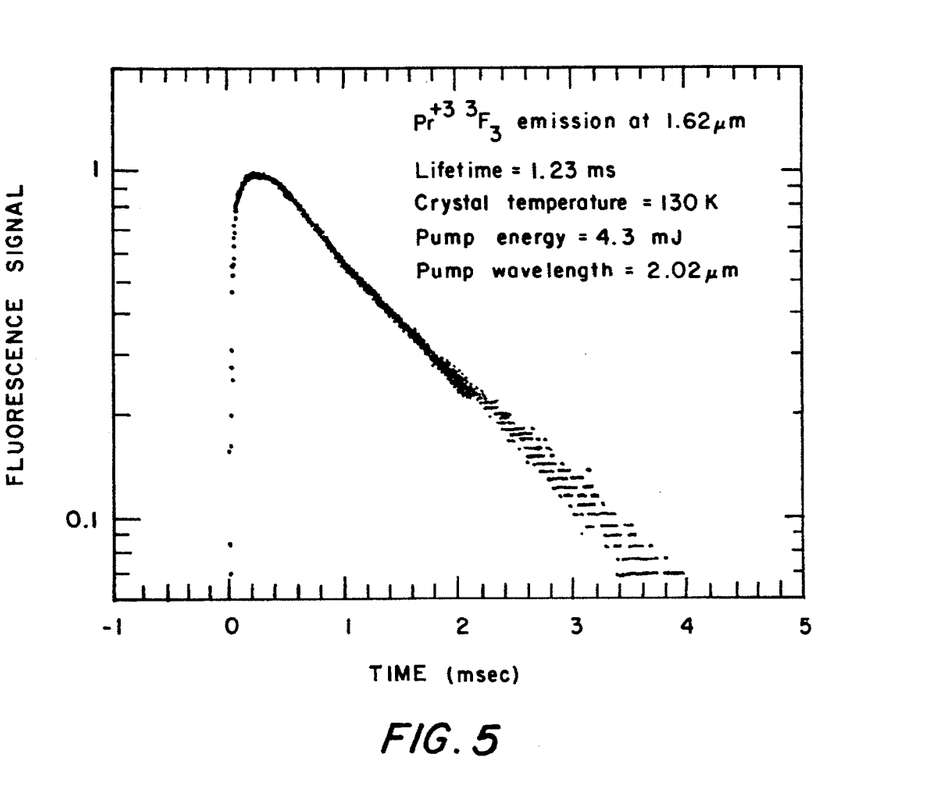
FIG. 5 shows the fluorescent lifetime of $Pr^{3+}$:$LaCl_3$ at 1.62 µm.

FIG. 5 shows the fluorescence lifetime of a $Pr^{3+}$ ion doped into an LaCl$_3$ host, when pumped at 2.02 μm. The particular fluorescent transition is from the $^3F_3$ excited state to the $^3H_4$ ground state. This demonstrates that the $^3F_3$ excited state has a sufficiently long lifetime to permit a population inversion to be created between the $^3F_3$ level and a lower level.

The selected geometry of the laser medium 12 and the selected pumping geometry will be interrelated with such factors as the doping level and the particular host selected. The laser medium may be end pumped, transverse pumped, or intracavity pumped. The laser medium 12 may be disposed in the cavity 17 with the ends of the medium parallel to the mirrors defining the cavity, or the medium may be disposed in the cavity at Brewster's angle. The size of the laser medium will also depend on the doping level. Typically, the laser medium will be between about 3 and about 10 mm long.

The parameters of the mirrors 18,20 that define the laser cavity will depend upon such factors as the desired wavelength of the output light and the pumping geometry employed. For laser operation at a particular wavelength, both mirrors 18,20 must be at least partially reflecting at this wavelength, and the output mirror 20 must only be partially reflecting (i.e., must be partially transmitting) at this wavelength. The other mirror 18, which typically will serve as the pump input mirror in an end pumped geometry, typically will be a high reflector at the output wavelength. Since many of the lasing transitions from the $^3F_3$ excited state are in competition, it will typically be desired to take steps to limit lasing to a single lasing transition. Both mirrors 18,20 may be flat and parallel, or one of the mirrors may be slightly concave.

Having described the invention, the following examples are given to illustrate specific applications of the invention, including the best mode now known to perform the invention. These specific examples are not intended to limit the scope of the invention described in this application.

EXAMPLE 1

Operation of a 5 μm Laser

Figure 6:
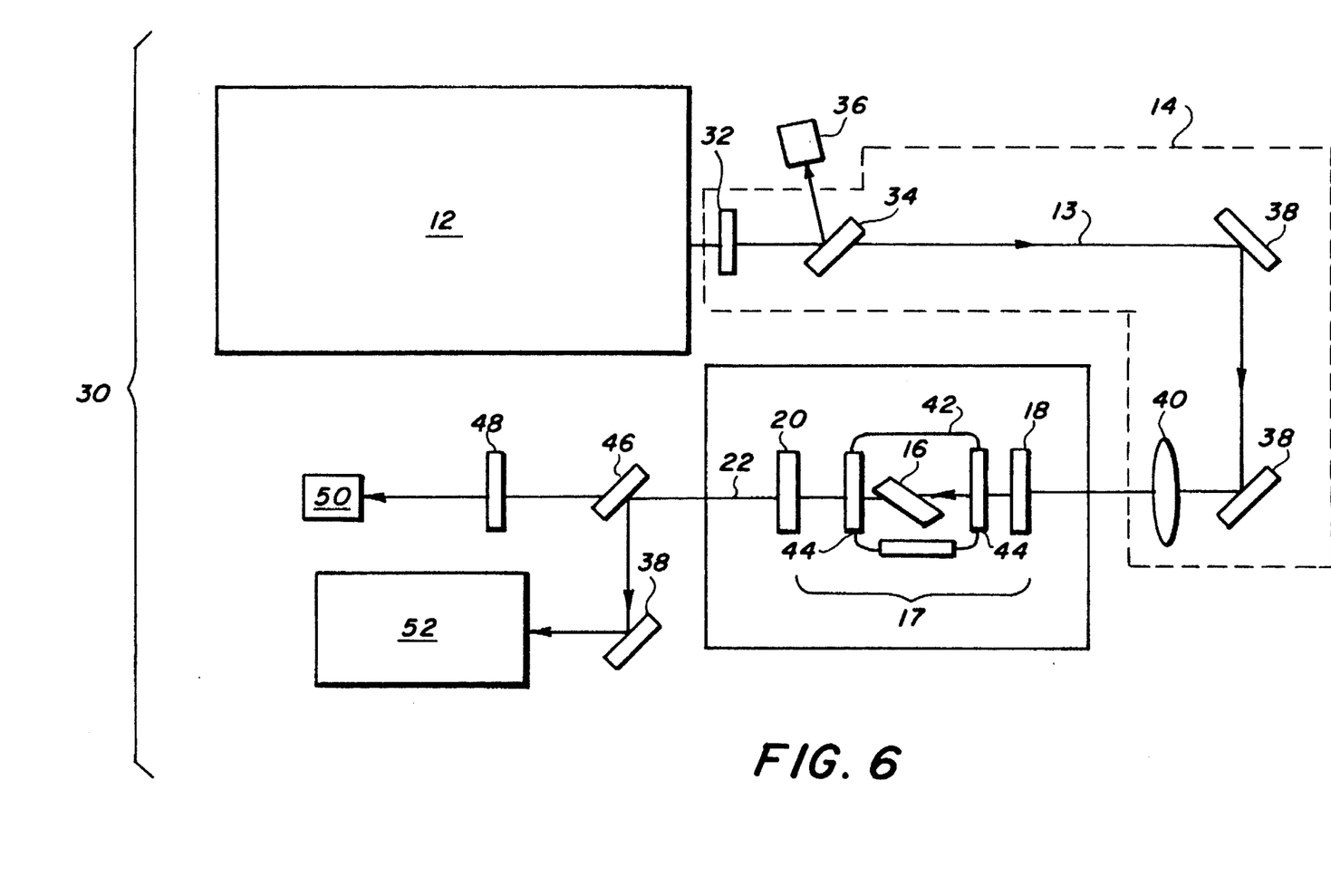
FIG. 6 shows an experimental setup for a laser according to the invention.

The experimental apparatus 30 apparatus shown in FIG. 6 was assembled. The pump 12 was a Tm:YAG laser producing 2.02 μm pump light 13. Polarization of the pump beam 13 was controlled with a λ/2 waveplate 32. Pump energy was monitored with an energy monitor 36 that monitored energy picked off from the pump beam 13 with a partially reflective glass plate 34.

The laser cavity 17 was defined by an input 18 and an output 20 mirror. The output mirror 20 was concave (20 cm focal length) and had a 90% reflectivity for 5 μm light. The input mirror was a flat high reflector for 5 μm light. The Pr-doped lanthanum trichloride laser medium 16 was approximately 3 mm thick and was polished on two faces. The medium 16 was mounted inside a liquid nitrogen dewar 42. The dewar was fitted with two antireflection windows 44 to transmit the output beam 22.

Inside the dewar 42, the laser medium 16 (3×3×15 mm) was mounted on a copper block (not shown), which was partially submerged in liquid nitrogen (not shown), and connected to an electrical heater (not shown). In this way, the temperature of the laser medium was controlled, and varied from about 100K to about 250K. Laser emission was observed throughout this range, and thus it is believed that laser emission will be achievable at room temperature.

Pump light 13 was directed into the laser medium 16 with coupling optics 14, that included a series of mirrors 38 and an objective lens 40 (20 cm focal length) that focused the pump beam to match the transverse laser mode of the 5 μm resonator at the 3 mm thick laser medium 16, which was inserted into the cavity at Brewster's angle.

Output light 22 exited through the output mirror 20, and was divided into two paths with a beamsplitter. A portion of the output light was monitored using an energy monitor 50, with a long pass filter 48 first removing any remaining pump light. The rest of the output light was directed, using a mirror 38, into a spectral analyzer 52.

With the Pr:LaCl$_3$ medium at 130K, the 5 μm laser threshold was 2.9 mJ of incident 2.0 μm pump energy. This corresponds to 1.6 mJ of pump energy absorbed in the Pr:LaCl$_3$ medium. The 5 μm laser emission was "P" polarized and was centered at 5.242 with a 47 nm full width at half max. When the coupling losses were reduced to 4%, simultaneous emission at both 5.242 and 5.117 was observed. Threshold, linewidth, and emission time for the 5.117 μm line were nearly identical to those of the 5.242 μm line.

Figure 7:
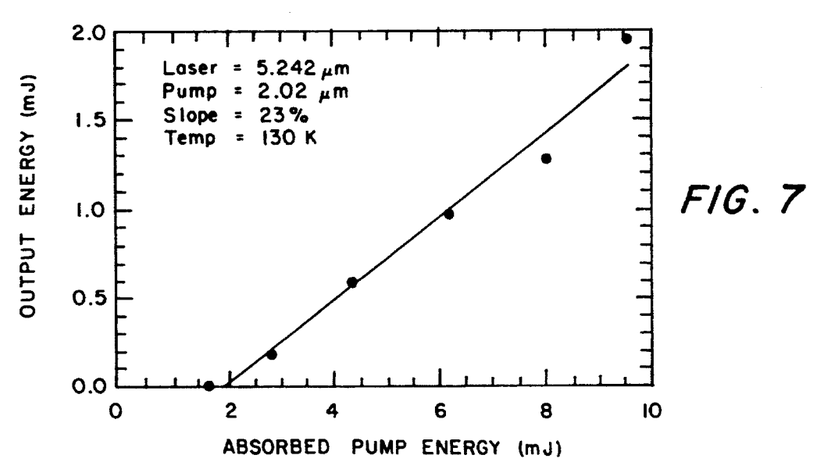
FIG. 7 shows the output of the 5.242 µm laser according to the invention.

FIG. 7 shows the 5.242 μm laser output with the medium held at 130K. The slope efficiency of the 5.242 μm laser was 23% of the absorbed pump energy. Absorbed pump energy was determined from simultaneous measurement of the 2.02 μm transmission.

Figure 8:
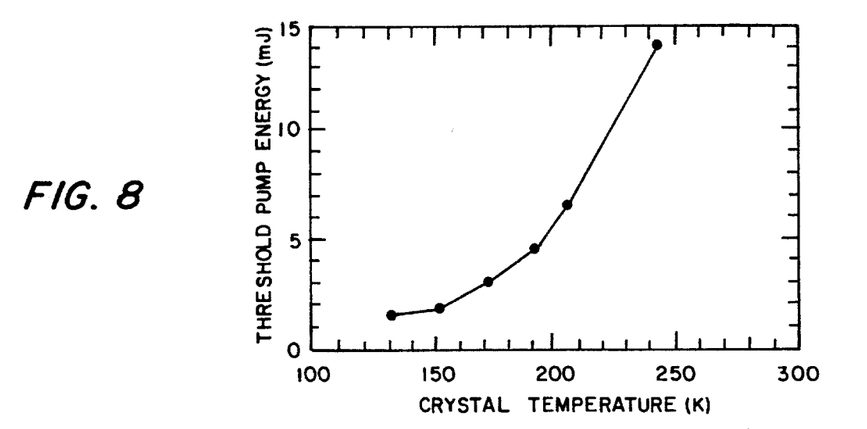
FIG. 8 shows the threshold of the 5.242 µm laser line as a function of crystal temperature.

FIG. 8 shows the threshold of the 5.242 μm laser line as a function of crystal temperature. Above 200K, the threshold climbs rapidly to an observed maximum of 14 mJ absorbed pump at 245K.

The 5.242 μm laser operated at repetition rates as high as 10 Hz with a 20% reduction in energy from the single shot values. The observed reduction in efficiency with increased firing rate may be due to crystal heating or simply to changes in the performance of the pump laser. The Pr:LaCl$_3$ medium was exposed to msec pumps with fluences as high as 25 J/cm$^2$ without any evidence of optical damage.

EXAMPLE 2

Operation of a 7 μm Laser

The apparatus shown in FIG. 6 was assembled, except that the Tm:YAG laser 12 produced free-running, S polarized, TEM$_{00}$ pulses at 2017 nm. The input mirror 18 was a high reflector of 7 μm light, and the output mirror 20 was a partial reflector of 7 μm light. The resonator was evacuated.

With the Pr:LaCl$_3$ laser medium 16 at 148K, the 7.24 μm laser threshold was 4 mJ of absorbed pump energy. Above the threshold the slope efficiency was 17% with a peak efficiency of 10%.

Figure 9:
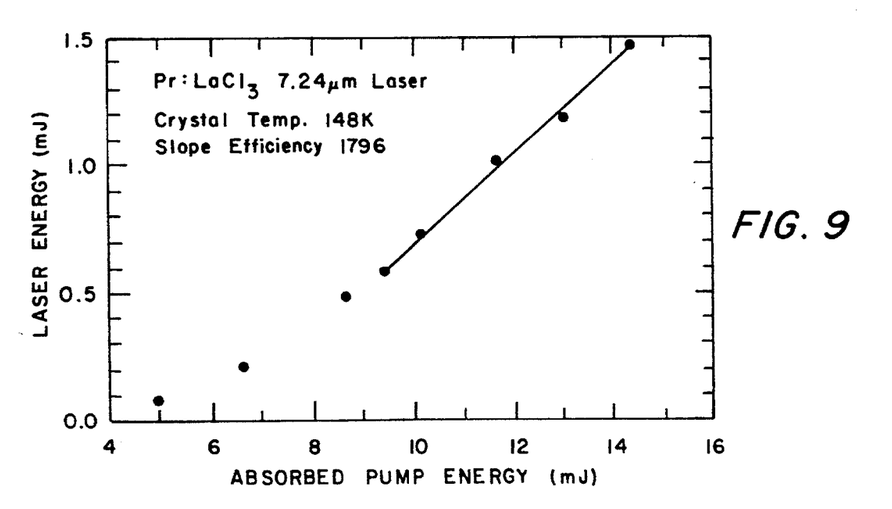
FIG. 9 shows the output of the 7.24 µm laser according to the invention.

FIG. 9 shows the output of the output of the 7.24 μm end pumped Pr:LaCl$_3$ laser.

EXAMPLE 3

Operation of a 1.6 μm Laser.

The apparatus shown in FIG. 6 was assembled, except that the input mirror 18 was a high reflector of 5 and 1.6 μm light, and the output mirror 20 was a partial reflector of 5 and 1.6 μm light.

When pumped above threshold, a second laser line was observed to be in competition with the 5.242 μm line. Emission at 1.644 μm began first and terminated when the emission at 5.242 μm began. Round trip cavity losses at 1.644 μm were determined to be 45%, indicating that this is a high gain transition.

A single MgF$_2$ tuning plate was added to the cavity to allow the selection of a single laser line.

Obviously, many modifications and variations of the present invention are possible in light of the above teachings. It is therefore to be understood that, within the scope of the appended claims, the invention may be practiced otherwise than as specifically described.

What is claimed is:

1. A solid state laser having an output at about 5 μm, comprising:

a laser cavity defined by a first mirror and an opposing second mirror, wherein said mirrors are at least partially reflective at about b 5μm;

a laser medium disposed in said laser cavity, consisting essentially of a low phonon energy host material, doped with an amount of praseodymium ions sufficient to produce a longitudinal mode laser emission from the transition of said praseodymium ions from the $^3F_3$ excited state to the $^3H_6$ excited state when said laser medium is pumped by pumping means; and means for pumping said laser medium.

2. The laser of claim 1, wherein said laser is an upconversion laser, wherein said amount of praseodymium ions is sufficient to permit a significant degree of interaction between praseodymium ions, and wherein said means for pumping said laser medium comprises means for exciting said praseodymium ions from the $^3H_4$ ground state to the $^3H_6$ excited state, thereby permitting said praseodymium ions to interact in an upconversion process, whereby a portion of said interacting praseodymium ions in said $^3H_6$ excited state relax to the $^3H_5$ excited state, and a portion of said interacting praseodymium ions are further excited to said $^3F_3$ excited state.

3. The laser of claim 2, wherein said means for pumping said laser medium further comprises a pump laser operating at a wavelength between about 1.9 μm and about 2.3 μm, and coupling optics for directing light from said pump laser into said laser medium.

4. The laser of claim 3, wherein said wavelength between about 1.9 μm and about 2.3 μm is about 2.0 μm.

5. The laser of claim 3, wherein said pump laser is a thulium solid state laser.

6. The laser of claim 2, wherein said amount of praseodymium ions is between about 10$^{18}$ and about 10$^{21}$ ions/cm$^3$ of said host material.

7. The laser of claim 1, wherein said low phonon energy host material is selected from the group consisting of lanthanum trichloride, lanthanum tribromide, lanthanum triiodide, yttrium trichloride, and lutetium trichloride.

8. The laser of claim 1, wherein said means for pumping said laser medium comprises means for exciting said praseodymium ions directly from the $^3H_4$ ground state to the $^3F_3$ excited state or the $^3F_4$ excited state.

9. The laser of claim 8, wherein said means for pumping comprise means for pumping at between about 1.45 μm and about 1.65 μm.

10. The laser of claim 9, wherein said means for pumping at between about 1.45 μm and about 1.65 μm further comprises a pump selected from the group consisting of erbium lasers and laser diodes, and coupling optics for directing pump light from said pump into said laser medium.

11. The laser of claim 8, wherein said amount of praseodymium ions is between about $10^{-}$ and about $10^{21}$ ions/cm$^3$ of said host material.

12. A solid state laser having an output at about 7 μm, comprising:

a laser cavity defined by a first mirror and an opposing second mirror, wherein said mirrors are at least partially reflective at about 7 μm;

a laser medium disposed in said laser cavity, consisting essentially of a low phonon energy host material, doped with an amount of praseodymium ions sufficient to produce a longitudinal mode laser emission from the transition of said praseodymium ions from the $^3F_3$ excited state to the $^3F_2$ excited state when said laser medium is pumped by pumping means; and means for pumping said laser medium.

13. The laser of claim 12, wherein said low phonon energy host material is selected from the group consisting of lanthanum trichloride, lanthanum tribromide, lanthanum triiodide, yttrium trichloride, and lutetium trichloride.

14. The laser of claim 12, wherein said laser is an upconversion laser, wherein said amount of praseodymium ions is sufficient to permit a significant degree of interaction between praseodymium ions, and wherein said means for pumping said laser medium comprises means for exciting said praseodymium ions from the $^3H_4$ ground state to the $^3H_6$ excited state, thereby permitting said praseodymium ions to interact in an upconversion process, whereby a portion of said interacting praseodymium ions in said $^3H_6$ excited state relax to the $^3H_5$ excited state, and a portion of said interacting praseodymium ions are further excited to said $^3F_3$ excited state.

15. The laser of claim 14, wherein said means for pumping said laser medium further comprises a pump laser operating at a wavelength between about 1.9 μm and about 2.3 μm, and coupling optics for directing light from said pump laser into said laser medium.

16. The laser of claim 15, wherein said wavelength between about 1.9 μm and about 2.3 μm is about 2.0 μm.

17. The laser of claim 15, wherein said pump laser is a thulium solid state laser.

18. The laser of claim 12, wherein said means for pumping said laser medium comprises means for exciting said praseodymium ions directly from the $^3H_4$ ground state to the $^3F_3$ excited state or the $^3F_4$ excited state.

19. The laser of claim 18, wherein said means for pumping comprise means for pumping at between about 1.45 μm and about 1.65 μm.

20. The laser of claim 19, wherein said means for pumping at between about 1.45 μm and about 1.65 μm further comprises a pump selected from the group consisting of erbium lasers and erbium laser diodes, and coupling optics for directing pump light from said pump into said laser medium.

21. The laser of claim 18, wherein said amount of praseodymium ions is between about $10^{18}$ and about $10^{21}$ ions/cm$^3$ of said host material.

22. A solid state laser having an output at about 1.6 μm, comprising:

a laser cavity defined by a first mirror and an opposing second mirror, wherein said mirrors are at least partially reflective at about 1.6 μm;

a laser medium disposed in said laser cavity, consisting essentially of a low phonon energy host material, doped with an amount of praseodymium ions sufficient to produce a longitudinal mode laser emission from the transition of said praseodymium ions from the $^3F_3$ excited state to the $^3H_4$ ground state when said laser medium is pumped by pumping means; and means for pumping said laser medium.

23. The laser of claim 22, wherein said low phonon energy host material is selected from the group consisting of lanthanum trichloride, lanthanum tribromide, lanthanum triiodide, yttrium trichloride, and lutetium trichloride.

24. The laser of claim 22, wherein said laser is an upconversion laser, wherein said amount of praseodymium ions is sufficient to permit a significant degree of interaction between praseodymium ions, and wherein said means for pumping said laser medium comprises means for exciting said praseodymium ions from the $^3H_4$ ground state to the $^3H_6$ excited state, thereby permitting said praseodymium ions to interact in an upconversion process, whereby a portion of said interacting praseodymium ions in said $^3H_6$ excited state relax to the $^3H_5$ excited state, and a portion of said interacting praseodymium ions are further excited to said $^3F_3$ excited state.

25. The laser of claim 22, wherein said means for pumping said laser medium comprises means for exciting said praseodymium ions directly from the $^3H_4$ ground state to the $^3F_6$ excited state or the $^3F_3$ excited state.

26. A solid state laser having an output at about 2.4 μm, comprising:

a laser cavity defined by a first mirror and an opposing second mirror, wherein said mirrors are at least partially reflective at about 2.4 μm;

a laser medium disposed in said laser cavity, consisting essentially of a low phonon energy host material, doped with an amount of praseodymium ions sufficient to produce a longitudinal mode laser emission from the transition of said praseodymium ions from the $^3F_3$ excited state to the $^3H_5$ excited state when said laser medium is pumped by pumping means; and means for pumping said laser medium.

27. The laser of claim 26, wherein said low phonon energy host material is selected from the group consisting of lanthanum trichloride, lanthanum tribromide, lanthanum triiodide, yttrium trichloride, and lutetium trichloride.

28. The laser of claim 26, wherein said laser is an upconversion laser, wherein said amount of praseodymium ions is sufficient to permit a significant degree of interaction between praseodymium ions, and wherein said means for pumping said laser medium comprises means for exciting said praseodymium ions from the $^3H_4$ ground state to the $^3H_6$ excited state, thereby permitting said praseodymium ions to interact in an upconversion process, whereby a portion of said interacting praseodymium ions in said $^3H_6$ excited state relax to the $^3H_5$ excited state, and a portion of said interacting praseodymium ions are further excited to said $^3F_4$ excited state.

29. The laser of claim 26, wherein said means for pumping said laser medium comprises means for exciting said praseodymium ions directly from the $^3H_4$ ground state to the $^3F_3$ excited state or the $^3F_4$ excited state.

30. A solid state Pt-doped laser having an output wavelength of about 1.6, 2.4 5, or 7 μm, comprising:

a laser cavity defined by a first mirror and an opposing second mirror, wherein said first mirror is reflective at said output wavelength of said laser, and said second mirror is partially reflective at said output wavelength of said laser;

a laser medium disposed in said cavity, consisting essentially of a low phonon energy host material, doped with an amount of praseodymium ions sufficient to produce a longitudinal mode laser emission from the transition of the praseodymium ions from the $^3F_3$ excited state of praseodymium to a lower energy state when the laser medium is pumped by pumping means, wherein the energy gap between said $^3F_3$ excited state and said lower energy state is equal to the energy of said output wavelength of said laser; and means for pumping said laser medium.

* * * * *